(12) United States Patent
Kokubu et al.

(10) Patent No.: US 12,065,983 B2
(45) Date of Patent: Aug. 20, 2024

(54) THROTTLE DEVICE

(71) Applicant: AISAN KOGYO KABUSHIKI KAISHA, Obu (JP)

(72) Inventors: Toshihide Kokubu, Bowling Green, KY (US); Yaojie Cao, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 93 days.

(21) Appl. No.: 17/904,504

(22) PCT Filed: Mar. 2, 2020

(86) PCT No.: PCT/JP2020/008583
§ 371 (c)(1),
(2) Date: Aug. 18, 2022

(87) PCT Pub. No.: WO2021/176489
PCT Pub. Date: Sep. 10, 2021

(65) Prior Publication Data
US 2023/0111887 A1    Apr. 13, 2023

(51) Int. Cl.
F02D 9/10     (2006.01)
F16K 1/22     (2006.01)
F16K 31/04    (2006.01)

(52) U.S. Cl.
CPC ......... F02D 9/1065 (2013.01); F02D 9/1005 (2013.01); F02D 9/1035 (2013.01); F16K 1/221 (2013.01); F16K 31/047 (2013.01)

(58) Field of Classification Search
CPC ...... F16K 1/221; F16K 31/047; F16K 31/535; F16K 31/043; F02D 9/1065;
(Continued)

(56) References Cited

U.S. PATENT DOCUMENTS 4,880,207 A  * 11/1989 Matsumoto ............... F02D 9/10
                                                    267/155
6,863,259 B2     3/2005 Torii et al.
(Continued)

FOREIGN PATENT DOCUMENTS

CN        1526929 A      9/2004
DE    102007000346 A1    1/2008
(Continued)

OTHER PUBLICATIONS

PCT/JP2020/008583 International Search Report and Written Opinion dated Apr. 14, 2020 (10 p.).
(Continued)

*Primary Examiner* — Matthew W Jellett
(74) *Attorney, Agent, or Firm* — CONLEY ROSE, P.C.

(57) ABSTRACT

A throttle device comprises a throttle body, a throttle gear, and a coil spring. The coil spring comprises an intermediate hook part, a return spring part that is wound in one direction from the intermediate hook part, and an opener spring part that is wound in the opposite direction from the intermediate hook part. A gear-side end part of the opener spring part is connected to the throttle gear. The throttle gear comprises a spring guide part that holds the inner circumferential side of the opener spring part. The throttle gear comprises an outer circumferential support part that abuts the outer circumferential side of the first turn of the opener spring part on the intermediate hook part side.

7 Claims, 10 Drawing Sheets

(58) Field of Classification Search
CPC ........ F02D 9/1005; F02D 9/1035; F02D 9/02; F02D 2009/0269
See application file for complete search history.

(56) References Cited

U.S. PATENT DOCUMENTS

| | | | |
|---|---|---|---|
| 6,962,325 B2 | 11/2005 | Torii et al. | |
| 6,986,336 B2 * | 1/2006 | Tanimura | F02D 9/1065 123/343 |
| 7,051,707 B2 | 5/2006 | Tanimura et al. | |
| 7,063,067 B2 * | 6/2006 | Kado | F02D 9/1065 123/399 |
| 7,073,483 B1 * | 7/2006 | Kurita | F16K 1/221 123/337 |
| 7,128,038 B2 * | 10/2006 | Kawai | F02D 9/1035 285/24 |
| 7,503,309 B2 | 3/2009 | Tanimura et al. | |
| 7,669,581 B2 * | 3/2010 | Sasaki | F02M 26/70 123/399 |
| 8,448,627 B2 | 5/2013 | Kondo et al. | |
| 11,248,714 B2 | 2/2022 | Higuchi | |
| 2004/0084016 A1 * | 5/2004 | Torii | F02D 11/10 123/399 |

FOREIGN PATENT DOCUMENTS

| | | | |
|---|---|---|---|
| DE | 602004006038 T2 | | 1/2008 |
| JP | 2004150324 A | | 5/2004 |
| JP | 2004301118 A | | 10/2004 |
| JP | 2005299413 A | | 10/2005 |
| JP | 2006022678 A | | 1/2006 |
| JP | 2011058408 A | | 3/2011 |
| JP | 2016166572 A | * | 9/2016 |
| JP | 2016166572 A | | 9/2016 |
| JP | 6392146 B2 | | 9/2018 |
| JP | 2019015248 A | | 1/2019 |

OTHER PUBLICATIONS

International Preliminary Report on Patentability dated Sep. 15, 2022 (6 p.).
Chinese Office Action dated Oct. 9, 2021, for Chinese Application No. 201910800133.X (10 p.).
Chinese Office Action dated Mar. 28, 2022, for Chinese Application No. 201910800133.X (12 p.).
Chinese Office Action dated Mar. 19, 2023, for Chinese Application No. 202210766887.X (8 p.).
German Office Action dated Oct. 17, 2022, for German Application No. 102019122946.4 (13 p.).
Japanese Office Action dated Jan. 21, 2022, for Japanese Application No. 2018-161220 (10 p.).

* cited by examiner

THROTTLE DEVICE

CROSS-REFERENCE TO RELATED APPLICATIONS

The present application is a 35 U.S.C. § 371 National Phase entry of, and claims to the benefit of, PCT Application No. PCT/JP2020/008583 filed Mar. 2, 2020, which is hereby incorporated herein by reference in its entirety for all purposes.

STATEMENT REGARDING FEDERALLY SPONSORED RESEARCH OR DEVELOPMENT

Not applicable.

BACKGROUND

The present disclosure generally relates to a throttle device.

Japanese Laid-Open Patent Publication No. 2016-166572 discloses a throttle device including a coil spring, which has a return spring portion for moving a throttle valve from the fully opened position to the default position (partially opened position) and an opener spring portion for moving the throttle valve from the fully closed position to the default position. The throttle device includes a guide member disposed between the opener spring portion and a guide portion of a throttle gear integrally rotated together with the throttle valve. The guide member may slide on the guide portion. The throttle gear includes an outer circumference supporting member formed thereon. The outer circumference supporting member is configured to abut the outer circumference of the first loop of the opener spring portion on the throttle gear side of the opener spring portion. This configuration can suppress the pressing force from the first loop of the opener spring portion on the throttle gear side thereof to the guide member.

SUMMARY

In one aspect of the present disclosure, a throttle device includes a throttle body having an intake passage therein, a throttle valve arranged within the intake passage, a throttle shaft connected to the throttle valve, a rotator configured to transmit a torque to the throttle shaft, and a coil spring arranged between the throttle body and the rotator. The coil spring includes a return spring portion consisting of a coil wound in a first direction, an opener spring portion consisting of a coil wound in a second direction that is opposite to the first direction, and an intermediate hook portion positioned between the opener spring portion and the return spring portion. The throttle body includes an opener stopper with which the intermediate hook portion comes into contact and a body-side engagement member with which a tip portion of the return spring portion is engaged. The rotator includes a rotator-side engagement member with which a tip portion of the opener spring portion is engaged, a spring guide facing an inner circumference of the opener spring portion, and an outer circumference supporting portion contacting an outer circumference of a first loop of the opener spring portion on the intermediate hook portion side.

In accordance with embodiments described herein, a guide member such as that required by Japanese Laid-Open Patent Publication No. 2016-166572 is omitted, thereby offering the potential to reduce the number of components. Accordingly, increases in the cost and the size of the throttle device may be reduced and/or avoided. Additionally, the outer circumference supporting member of the rotator contacts the outer circumference of the first loop of the opener spring portion of the coil spring on the intermediate hook portion side, and thus, the first loop is spaced away from the spring guide of the rotator. Accordingly, sliding friction generated between at least the first loop of the opener spring portion on the intermediate hook portion side and the spring guide member of the rotator may be reduced. In this disclosure, the rotator may be referred to as and corresponds to an embodiment of a "member with which the inner circumference of the opener spring portion comes into contact."

DETAILED DESCRIPTION

In the case of the throttle device, provision of the guide member increases the number of components, thereby increasing costs and the size thereof. However, if the guide member were to be omitted, the first loop on the intermediate hook portion side would push against the guide portion of the throttle gear due to the reaction force against the torsional torque of the opener spring portion. Therefore, the sliding friction therebetween would increase. Accordingly, there has been a need for improved throttle devices.

Hereinafter, embodiments for carrying out the present invention will be described with reference to the drawings.

Figure 1:
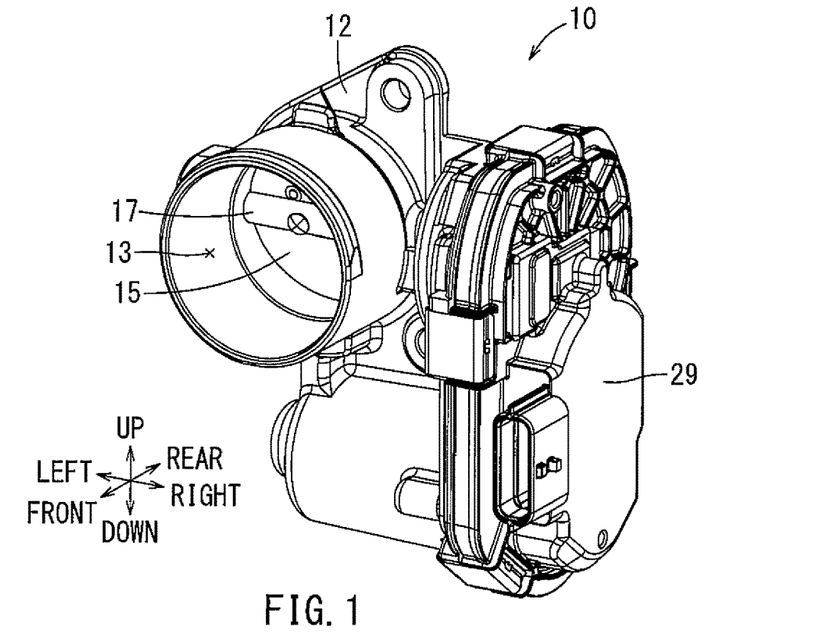
FIG. 1 is a perspective view of a first embodiment of a throttle device in accordance with the principles described herein.
Figure 2:
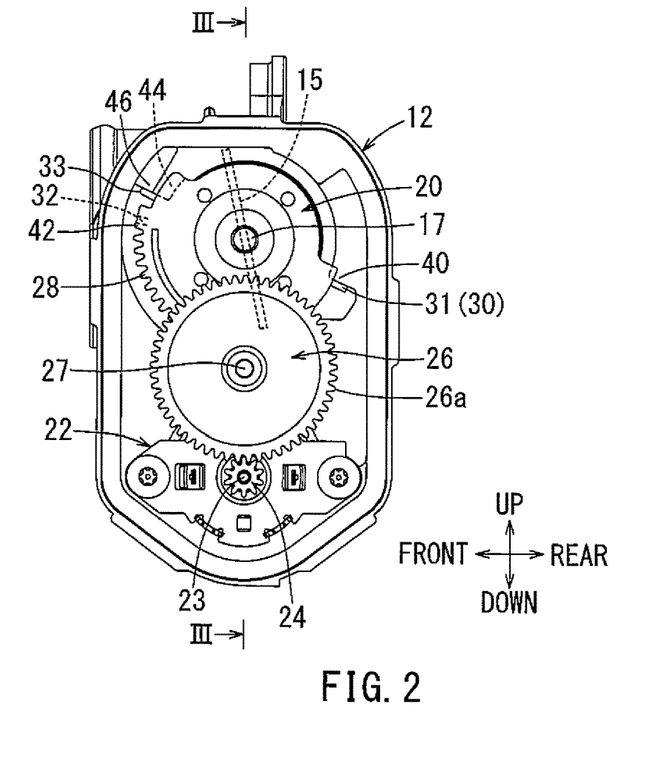
FIG. 2 is a side view of the throttle device of FIG. 1 in a default state and with a gear case cover removed to illustrate a throttle gear.
Figure 3:
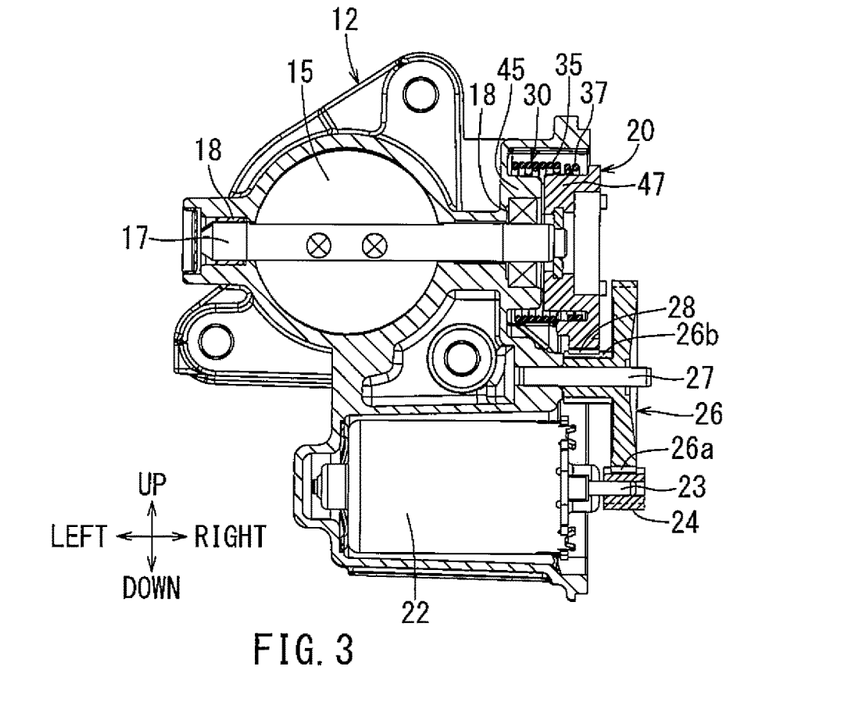
FIG. 3 is a cross sectional view of the throttle device of FIG. 1 taken along line III-III of FIG. 2.
Figure 4:
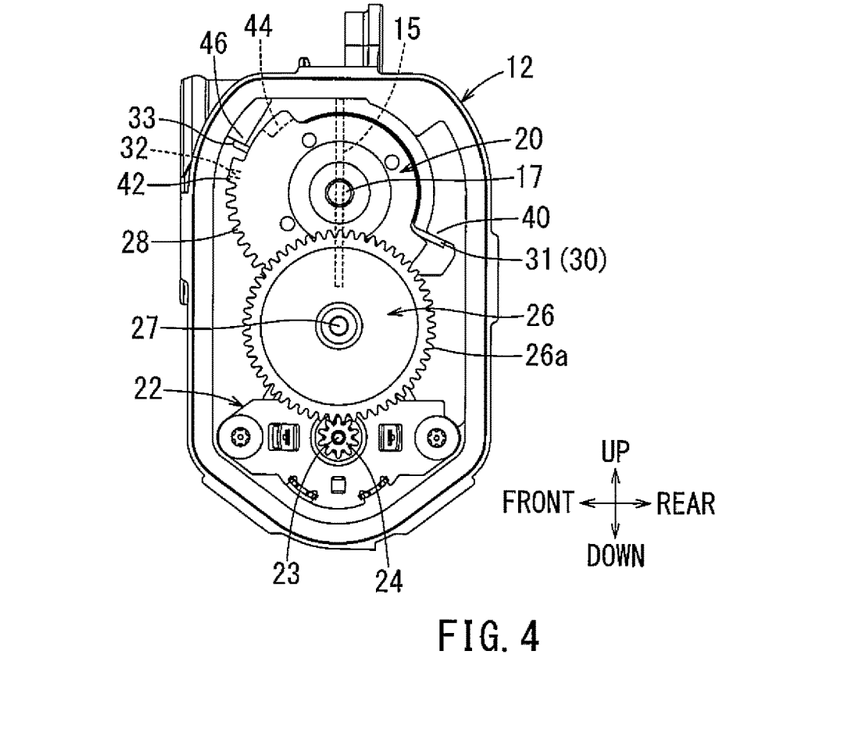
FIG. 4 is a side view of the throttle device of FIG. 1 in a fully closed state and with the gear case cover removed.
Figure 5:
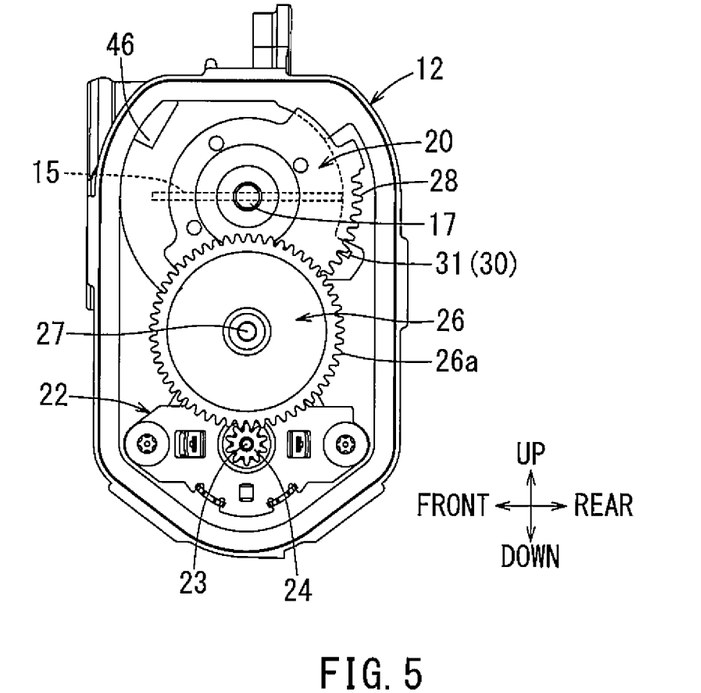
FIG. 5 is a side view of the throttle device of FIG. 1 in a fully opened state and with the gear case cover removed.
Figure 6:
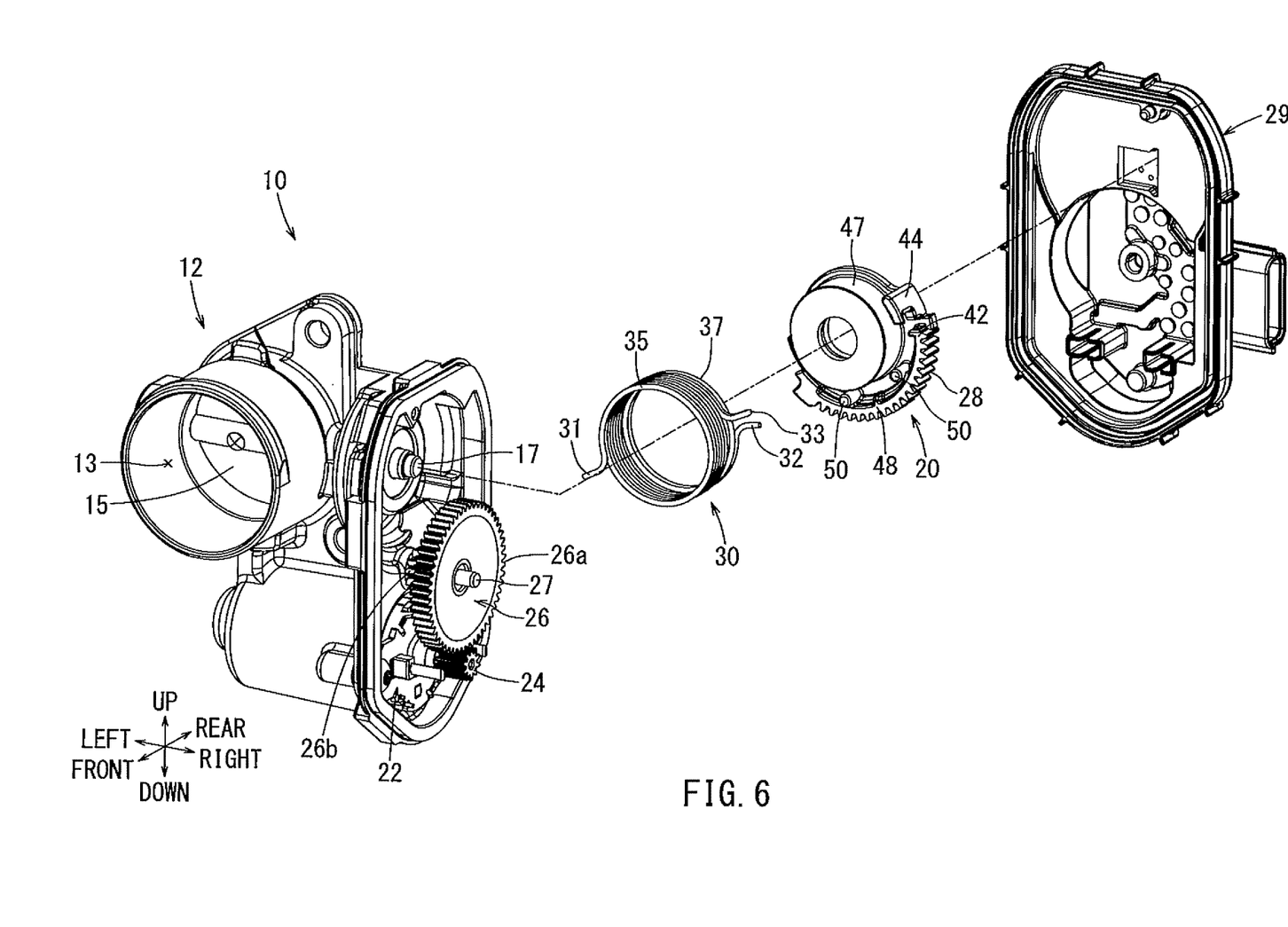
FIG. 6 is an exploded perspective view of the throttle device of FIG. 1.

An embodiment of a throttle device 10 configured to be mounted on a vehicle, such as an automobile, and to adjust the amount of air to be taken into an engine (internal combustion engine) of the vehicle is shown in FIGS. 1-6. FIG. 1 is a perspective view of the throttle device 10. FIG. 2 is a side view of the throttle device 10 in a default state and with a gear case cover 29 removed. FIG. 3 is a cross sectional view taken along line III-III of FIG. 2. FIG. 4 is a side view of the throttle device 10 in a fully closed state and with the gear case cover 29 removed. FIG. 5 is a side view of the throttle device 10 in a fully opened state and with the gear case cover 29 removed. FIG. 6 is an exploded view of the throttle device 10 showing the throttle body side components, a coil spring 30, a throttle gear 20, and the gear case cover 29. In FIGS. 1 to 5, respective directions of the throttle device 10 are defined as shown by arrows in the drawings, which are not intended to exclusively specify orientation or arrangement directions of the throttle device 10. In FIG. 6, the dashed-dotted line indicates the axis extending in the right-left direction.

As shown in FIG. 1, the throttle device 10 includes a throttle body 12 and a throttle valve 15 having a substantially circular disc shape. The throttle body 12 includes an intake passage 13 therein. The throttle valve 15 is rotatably positioned within the intake passage 13. The throttle valve 15 is fixably attached to a throttle shaft 17. The throttle body 12, the throttle valve 15, and the throttle shaft 17 are made of metal.

As shown in FIG. 3, both ends of the throttle shaft 17 are rotatably supported by a pair of bearings 18 attached to the throttle body 12. When the throttle shaft 17 rotates, the throttle valve 15 also rotates. A throttle gear 20 is fixably attached to one end (the right end) of the throttle shaft 17. The throttle gear 20 may also be referred to as and corresponds to an embodiment of the "rotator" of the description.

The throttle body 12 is equipped with an electric motor 22. A gearwheel 24 is attached to the tip of a motor shaft 23 of the motor 22. As shown in FIG. 2, the gearwheel 24 meshes with a larger gearwheel 26a of an intermediate gear 26. As shown in FIG. 3, the intermediate gear 26 consists of a double-decker gearwheel including the larger gearwheel 26a and a smaller gearwheel 26b. The smaller gearwheel 26b of the intermediate gear 26 meshes with teeth 28 of the throttle gear 20. The intermediate gear 26 is rotatably supported within the throttle body 12 by an intermediate shaft 27.

The motor 22 is driven and controlled by an Electronic Control Unit (ECU). The driving force of the motor 22 is transmitted to the throttle gear 20 via the gearwheel 24 and the intermediate gear 26. By the above-mentioned configurations, the throttle gear 20 can be selectively rotated toward the opening and closing directions. The throttle shaft 17 and the throttle valve 15 are rotated simultaneously with the throttle gear 20 to move the throttle valve 15 between an open state and a closed state. When the rotating direction of the motor shaft 23 of the motor 22 is changed, the rotating direction of the throttle valve 15 also changes. That is, the opening degree of the throttle valve 15 can be selectively adjusted by the motor 22. As illustrated in FIG. 1, a gear case cover 29 is attached to the right side of the throttle body 12 and covers a gearwheel transmission mechanism including the throttle gear 20, the gearwheel 24, and the intermediate gear 26.

As illustrated in FIG. 4, the throttle valve 15 is in a fully closed state with the throttle valve 15 oriented substantially perpendicular to the flow of the air within the intake passage 13 in the front-rear direction. On the other hand, as illustrated in FIG. 5, the throttle valve 15 is in a fully opened state with the throttle valve 15 oriented substantially parallel to the flow of the air within the intake passage 13 in the front-rear direction.

The throttle device 10 is configured so as not to be in the fully closed state when no electricity is provided to the motor 22. Specifically, when no electricity is provided for the motor 22, the throttle valve 15 is in a default state as illustrated in FIG. 2, where the throttle valve 15 is slightly opened from the fully closed state. In the default state, a slight amount of the air may pass through the intake passage 13 in the front-rear direction.

As illustrated in FIG. 3, the throttle device 10 of the present embodiment includes a coil spring 30 configured to force the throttle valve 15 to enter the default state when the motor 22 is not provided with any electricity. In particular, the coil spring 30 biases the throttle valve 15, when in a state other than the default state, to the default state. When the motor 22 is in an energized state, that is, the state in which the motor 22 can selectively and controllably rotate the motor shaft 23, the biasing force of the coil spring 30 is not sufficient to place the throttle valve 15 in the default state. The biasing force of the coil spring 30 is set such that the coil spring 30 can place the throttle valve 15 into the default state by the elastic restoring force thereof when the supply of electricity to the motor 22 stops.

The coil spring 30 can return the throttle valve 15 to the default state from both: a state where the throttle valve 15 opens more than the default state; and a state where the throttle valve 15 opens less than the default state. The cross section of a coil wire constituting the coil spring 30 is shaped into a circular shape. As illustrated in FIG. 6, the coil spring 30 is wound into a right circular cylinder shape and the winding direction of the coil spring 30 is reversed at an intermediate portion thereof. The coil spring 30 includes a body-side end 31 at one end thereof, and a gear-side end 32 at the other end thereof.

Figure 7:
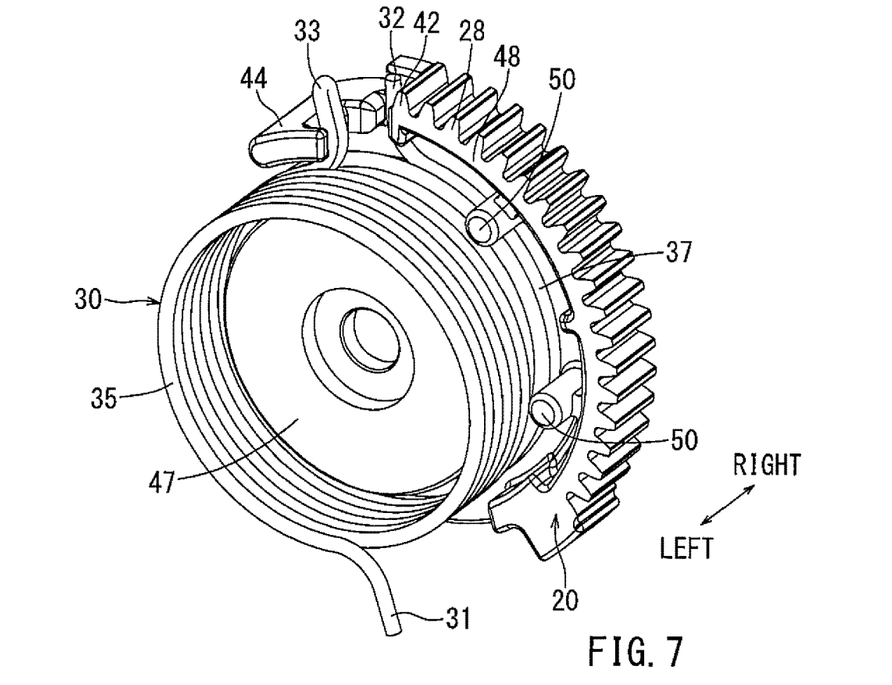
FIG. 7 is a perspective view of the throttle gear of FIG. 2 with the coil spring attached thereto.
Figure 8:
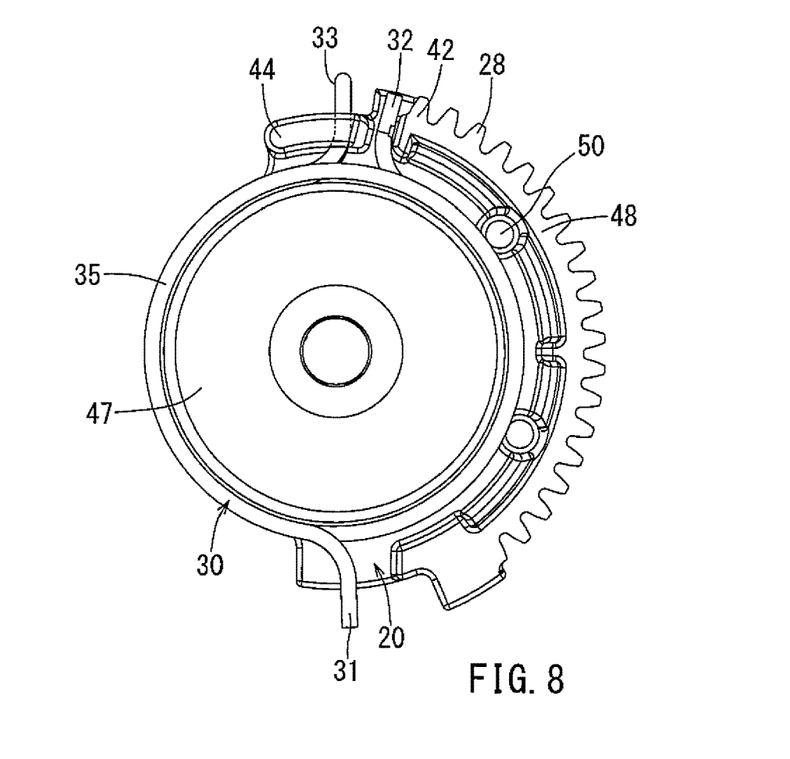
FIG. 8 is a side view of the throttle gear of FIG. 2 with the coil spring attached thereto.

As illustrated in FIG. 2, the body-side end 31 of the coil spring 30 is engaged with and coupled to a body-side engagement member 40 of the throttle body 12. The gear-side end 32 of the coil spring 30 is engaged with and coupled to a gear-side engagement member 42 of the throttle gear 20. That is, the coil spring 30 is interposed between the throttle body 12 and the throttle gear 20. The gear-side engagement member 42 may also be referred to as and corresponds to an embodiment of the "rotator-side engagement member" in the description. FIG. 7 is the perspective view of the throttle gear, with the coil spring attached thereto. FIG. 8 is the side view of the same.

As illustrated in FIG. 7, a portion of the coil spring 30 where the winding direction is reversed is an intermediate hook portion 33. The intermediate hook portion 33 is formed into a U-shape and extends radially outward from the outer diameter of the coil spring 30. A portion of the coil spring 30 positioned between the body-side end 31 and the intermediate hook portion 33, and that is wound in a first direction is referred to as a return spring portion 35. On the other hand, a portion of the coil spring 30 that is positioned between the gear-side end 32 and the intermediate hook portion 33, and that is wound in a second direction opposite to the first direction is referred to as an opener spring portion 37. When no force is applied to the coil spring 30, both the return spring portion 35 and the opener spring portion 37 have substantially uniform outer diameters and substantially uniform inner diameters.

The body-side end 31 and the gear-side end 32 extend radially outward from the outer circumference of the coil spring 30. As illustrated in FIG. 2, the body-side end 31 and the gear-side end 32 of the coil spring 30 are engaged with the body-side engagement member 40 and the gear-side engagement member 42, respectively, with both the return spring portion 35 and the opener spring portion 37 being wound such that the inner diameters thereof become smaller. The body-side end 31 may also be referred to as and corresponds to an embodiment of the "tip of the return spring portion" in the description. The gear-side end 32 may also be referred to as and corresponds to an embodiment of the "tip of the opener spring portion" of the description.

As illustrated in FIGS. 7 and 8, the intermediate hook portion 33 is engaged with a hook stopper 44 provided on the throttle gear 20. The intermediate hook portion 33 is configured to be spaced away from the hook stopper 44 when moving in the opening direction from the hook stopper 44. As illustrated in FIGS. 4 and 5, the intermediate hook portion 33 may come into contact with an opener stopper 46 of the throttle body 12. Also, the intermediate hook portion 33 is configured to be spaced away from the opener stopper 46 when moving in the opening direction.

While the throttle gear 20 rotates from the default state shown in FIG. 2 to the fully closed state shown in FIG. 4, the intermediate hook portion 33 comes into contact with the opener stopper 46. At this time, since the throttle gear 20 rotates with respect to the opener stopper 46, the hook stopper 44 of the throttle gear 20 separates from the intermediate hook portion 33. Also, the opener spring portion 37 elastically deforms so as to have a smaller inner diameter. When the electricity supply to the motor 22 stops in this state, the throttle gear 20 returns to the default state by the elastic restoring force of the opener spring portion 37. It should be noted that the inner diameter of the return spring portion 35 does not become smaller while the throttle gear 20 rotates from the default state to the fully closed state.

While the throttle gear 20 rotates from the default state shown in FIG. 2 to the fully opened state shown in FIG. 5, the intermediate hook portion 33 is maintains engagement with the hook stopper 44 of the throttle gear 20. Thus, the return spring portion 35 elastically deforms so as to have a smaller inner diameter. When the electricity supply to the motor 22 stops in this state, the throttle gear 20 returns to the default state by the elastic restoring force of the return spring portion 35. It should be noted that the inner diameter of the opener spring portion 37 does not become smaller while the throttle gear 20 rotates from the default state to the fully opened state.

As illustrated in FIG. 3, the throttle gear 20 includes a cylindrical spring guide 47 having a hollow cylindrical shape. The spring guide 47 is positioned within the coil spring 30 and is disposed about an outer circumference of the throttle shaft 17. The spring guide 47 projects leftward from a right-side portion of the throttle gear 20 in a concentric manner.

The spring guide 47 is fitted within a portion (e.g., two loops) of the return spring portion 35 of the coil spring 30 on the intermediate hook portion 33 side. The spring guide 47 is also fitted within (e.g. two loops of) the opener spring portion 37. The spring guide 47 supports the inner circumference of the portion of the return spring portion 35 near the intermediate hook portion 33. The spring guide 47 also supports the inner circumference of the opener spring portion 37. The throttle body 12 has a boss 45 having a cylindrical shape for attaching the right bearing 18 thereto. The boss 45 is fitted within the remaining portion of the return spring portion 35.

Figure 9:
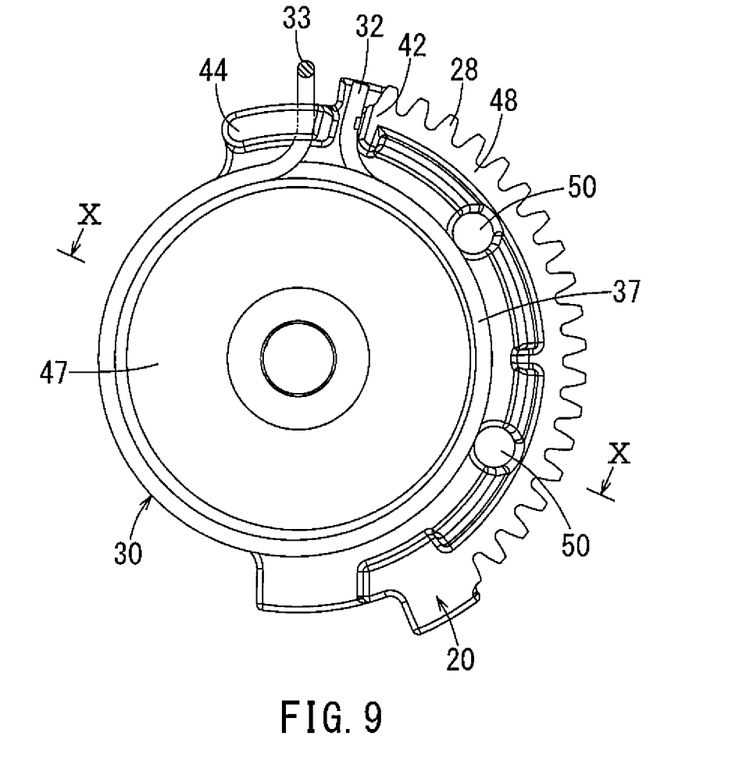
FIG. 9 is a side view of the throttle gear of FIG. 7 showing the positional relationship of the throttle gear and an opener spring portion of the coil spring.
Figure 10:
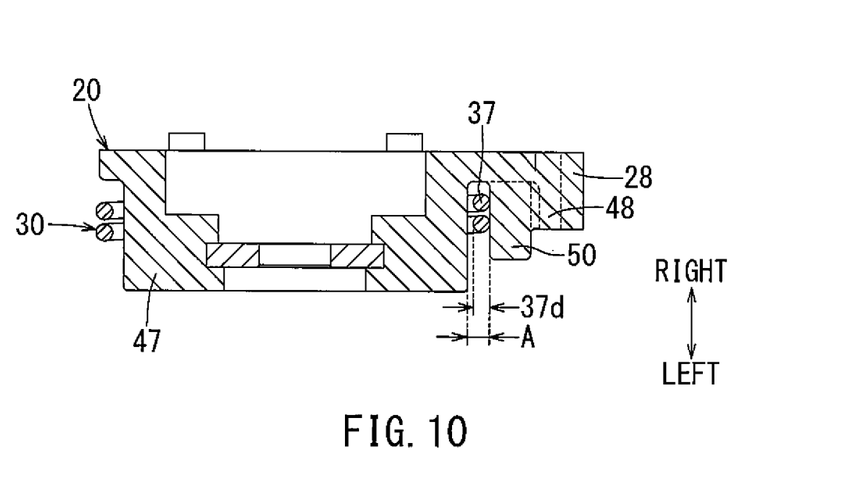
FIG. 10 is a cross sectional view of the throttle gear of FIG. 7 taken along line X-X of FIG. 9.

FIG. 9 is the side view showing the positional relationship of the throttle gear and the opener spring portion. FIG. 10 is the cross sectional view taken along line X-X of FIG. 9. As illustrated in FIGS. 9 and 10, an arc-shaped base portion 48, which supports the teeth 28 of the throttle gear 20, is provided along the outer periphery of the base end of the spring guide 47, so as to be partially concentric with the spring guide 47 and have a predetermined gap.

The inner diameter of the coil spring 30, which is disposed about the outer periphery of the spring guide 47, is greater than the outer diameter of the spring guide 47. Specifically, the coil spring 30 is formed such that when the coil spring 30 is attached to the throttle body 12 as shown in FIG. 3, the inner diameter of the coil spring 30 is greater than the outer diameter of the spring guide 47 at any operable state of the throttle valve 15.

As illustrated in FIGS. 9 and 10, the throttle gear 20 includes a plurality of outer circumference supporting members 50 configured to abut the outer circumference of the opener spring portion 37 of the coil spring 30. The outer circumference supporting members 50 are integrated with the throttle gear 20. In the present embodiment, a plurality (two are illustrated in FIG. 9) of the outer circumferential supporting members 50 are circumferentially spaced at predetermined intervals and arranged on the inner periphery side of the base portion 48. Each outer circumferential supporting members 50 is shaped as a circular column extending parallel to the axial direction of the throttle gear 20 (the right-left direction). Thus, each outer circumferential supporting members 50 is in point-contact with a portion of the outer circumference of the opener spring portion 37. The outer circumferential supporting members 50 are shaped such that the outer circumferential supporting members 50 maintain contact with at least the first loop of the opener spring portion 37 on the intermediate hook portion 33 side, even when the inner diameter of the coil spring 30 is at its smallest.

The outer circumferential supporting members 50 are positioned where the force of the opener spring portion 37 pushing against the spring guide 47 may lower. Thus, the outer circumferential supporting members 50 are formed so as to push the opener spring portion 37 toward the opposite direction to the direction in which the opener spring portion 37 may push against the spring guide 47 due to the reaction force of the torsional torque of the opener spring portion 37.

Figure 11:
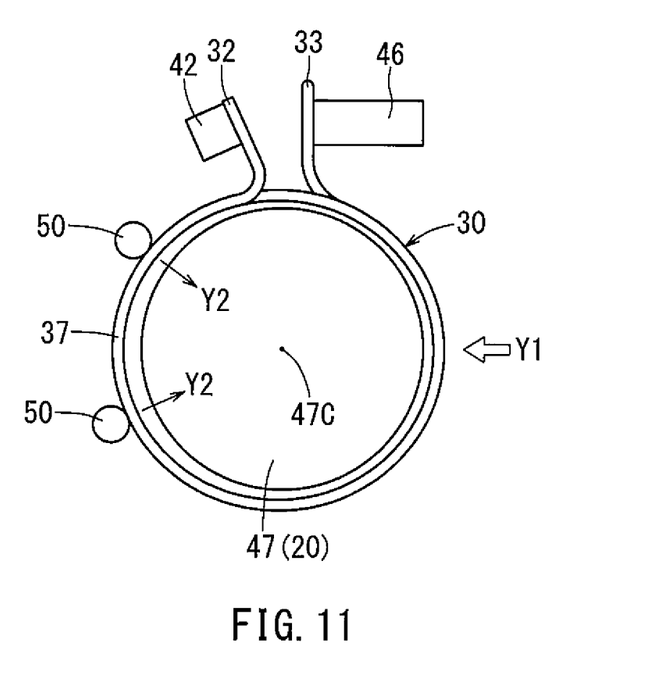
FIG. 11 is a schematic view of the throttle gear of FIG. 7 showing the positional relationship of the throttle gear and the opener spring portion, which are viewed in an axial direction.
Figure 12:
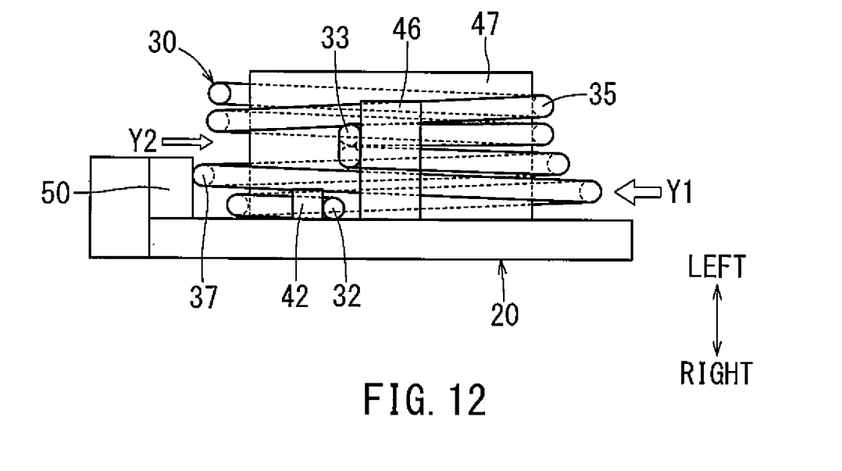
FIG. 12 is a schematic view of the throttle gear of FIG. 7 showing the positional relationship of the throttle gear and the opener spring portion, which are viewed in a radial direction.

FIG. 11 is a schematic view showing the positional relationship of the throttle gear and the opener spring portion, which are viewed in the axial direction. FIG. 12 is the schematic view showing the same, which is viewed in the radial direction. In FIGS. 11 and 12, the arrow Y1 shows the direction where the opener spring portion 37 pushes the spring guide 47 due to the reactive force of the torsional torque of the opener spring portion 37. Also, the arrows Y2 show the directions where the outer circumferential supporting members 50 apply the pressing force to the opener spring portion 37. The opener spring portion 37 is positioned to be in contact with the supporting members 50 within a range of 180° to 360°, along the direction in which the coil of the spring travels of the opener spring portion 37, from the intermediate hook portion 33.

The outer circumferential supporting members 50 support the outer periphery of at least the first loop of the opener spring portion 37 on the intermediate hook portion 33 side in a contacting manner. Thus, the portion of the first coil opposite to the portion being contacted by the supporting members 50 is positioned so as to be separated from the spring guide 47, thereby allowing contact of such portion and the spring guide 47 to be avoided. It should be noted that the supporting members 50 do not serve to allow the first loop of the opener spring portion 37 to come in contact with the spring guide 47.

As illustrated in FIG. 10, the minimum distance A between the spring guide 47, on which the opener spring portion 37 is mounted, and the supporting members 50 is set to no more than twice the wire diameter 37d of the opener spring portion 37.

The throttle device 10 of the first embodiment does not require the guide members required in Japanese Laid-Open Patent Publication No. 2016-166572, thereby preventing an increase in the number of the components. Accordingly, this prevents an increase in cost and larger dimensions of the throttle device 10.

The supporting members 50 on the throttle gear 20 are in contact with at least the first loop of the opener spring portion 37 on the intermediate hook portion 33 side such that the first loop is positioned apart from the spring guide 47 of the throttle gear 20. Accordingly, a sliding friction between the spring guide 47 of the throttle gear 20 and at least the first loop of the opener spring portion 37 on the intermediate hook portion 33 side can be reduced. This reduces wear of the spring guide 47. Further, the load of the motor 22 is also reduced, which contributes to downsizing the motor 22 and the throttle device 10.

Figure 13:
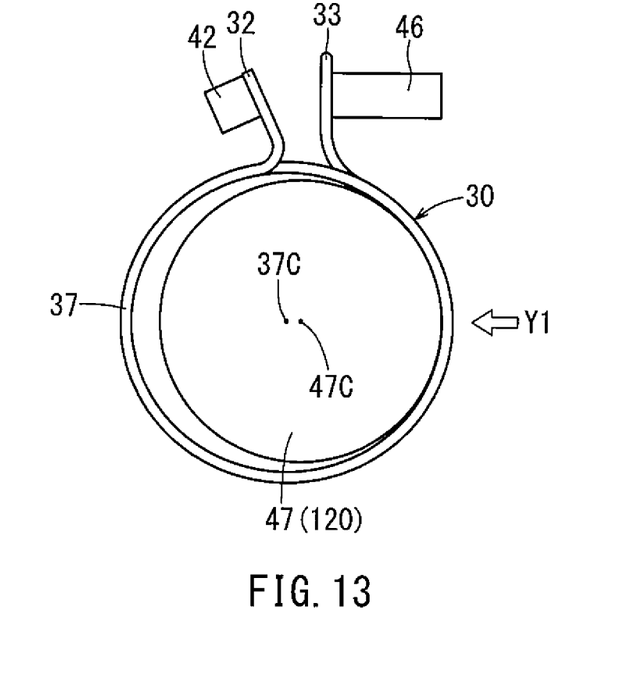
FIG. 13 is a schematic view of the throttle gear of FIG. 7 illustrating a first comparative example the positional relationship of the throttle gear and an opener spring portion of a coil spring attached thereto, which are viewed in an axial direction.
Figure 14:
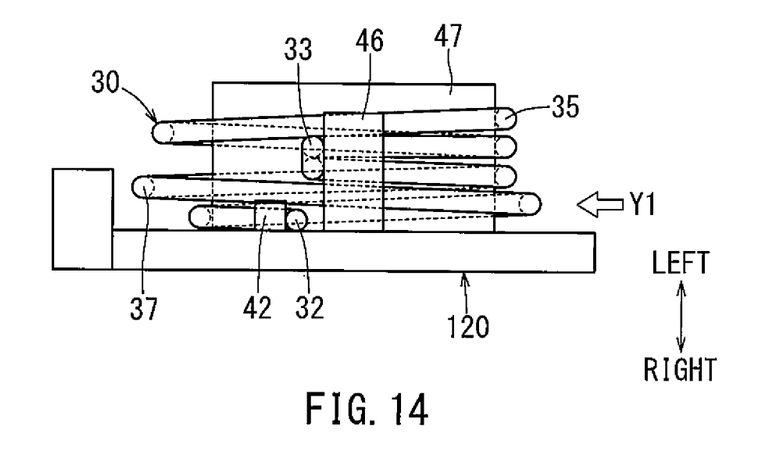
FIG. 14 is a schematic view of the throttle gear of FIG. 7 illustrating the positional relationship of the throttle gear and the opener spring portion of FIG. 13, which are viewed in a radial direction.

Here will be described the effect of reducing the slide friction between the opener spring portion 37 and the spring guide 47 with reference to a first comparative example. FIG. 13 is the schematic view showing the positional relationship of the throttle gear and the opener spring portion of the first comparative example, which are viewed in the axial direction. FIG. 14 is the schematic view showing the same, which is viewed in the radial direction. Throughout the first comparative example, like components are referred to by the same reference numerals as the first embodiment, and thus, detailed descriptions thereof will be omitted. As shown in FIGS. 13 and 14, a throttle gear (labeled with the reference numeral 120) of the first comparative example is not provided with the supporting members 50 of the first embodiment as shown in FIGS. 11 and 12. The other configurations are substantially the same as the first embodiment.

In the first comparative example, the reactive force with respect to the torsional torque applied to the opener spring portion 37 (shown as the arrow Y1 in FIGS. 13 and 14) decenters the coil center 37C of the opener spring portion 37 with respect to the axial center 47C of the spring guide 47. Thus, the inner circumference of one side (right side in FIGS. 13 and 14) of the opener spring portion 37 comes into contact with the outer circumference of the spring guide 47.

At the same time, the other side (left side in FIGS. 13 and 14) of the return spring portion 35 separates from the spring guide 47.

It should be noted that the opener spring portion 37 does not necessarily exhibit the same behavior at every location thereof. For example, while the throttle gear 20 rotates between the default position and fully closed position, a portion of the opener spring portion 37 in the vicinity of the gear-side end 32 behaves so as to follow the throttle gear 20. However, movement of a portion of the opener spring portion 37 in the vicinity of the intermediate hook portion 33 is restricted by the opener stopper 46, and thus, such portion moves with respect to the throttle gear 20. Accordingly, during the rotation of the throttle gear 20 between the default position and the fully closed position, the sliding friction, also referred to as scrape, is greater between the first loop of the return spring portion 35 on the intermediate hook portion 33 side and the spring guide 47.

In the first embodiment on the other hand, the supporting members 50 of the throttle gear 20 come into contact with the outer circumference of at least the first loop of the opener spring portion 37 on the intermediate hook portion 33 side as shown in FIGS. 11 and 12. By such contact, the entire circumference of at least the first loop of the opener spring portion 37 on the intermediate hook portion 33 side is maintained to be separated from the spring guide 47. Accordingly, the sliding friction between at least the first loop of the opener spring portion 37 on the intermediate hook portion 33 side and the spring guide 47 of the throttle gear 20 can be reduced.

Additionally, the supporting members 50 are arranged at a position to abut the opener spring portion 37 within a range of 180° to 360° in a direction along the opener spring portion 37 from the intermediate hook portion 33. Accordingly, the sliding friction that could have been generated at the site where relative movement between the first loop of the opener spring portion 37 on the intermediate hook portion 33 side and the spring guide 47 is relatively large can be effectively reduced.

Additionally, the minimum distance A between the spring guide 47 and the supporting members 50 is set to no more than twice the wire diameter 37d of the opener spring portion 37. Accordingly loops each belonging to the opener spring portion 37 are prevented from overlapping with each other, and thus, the position of the opener spring portion 37 can be kept stable.

Figure 15:
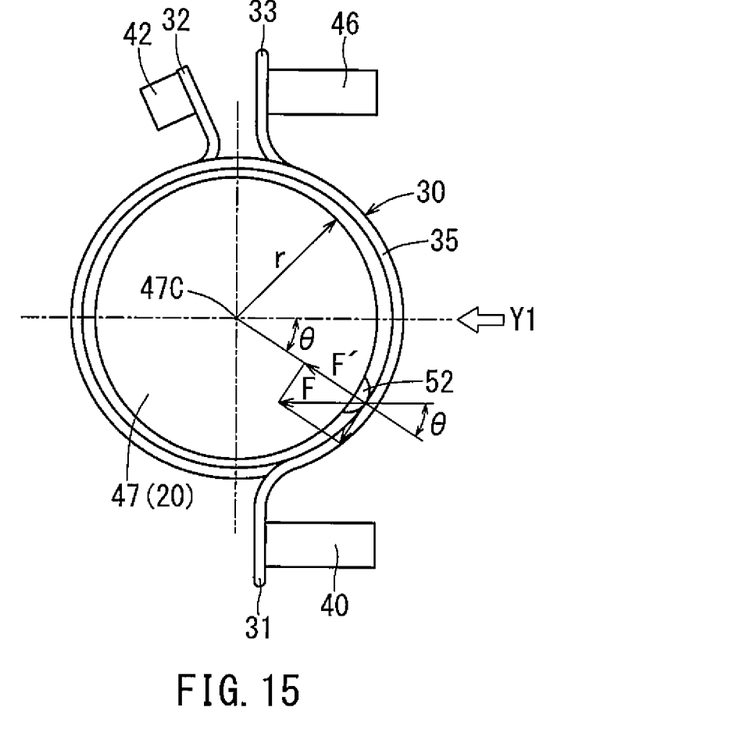
FIG. 15 is a schematic view of a second embodiment of a throttle gear and illustrating the positional relationship of the throttle gear and a return spring portion of a coil spring attached thereto, which are viewed in an axial direction.
Figure 16:
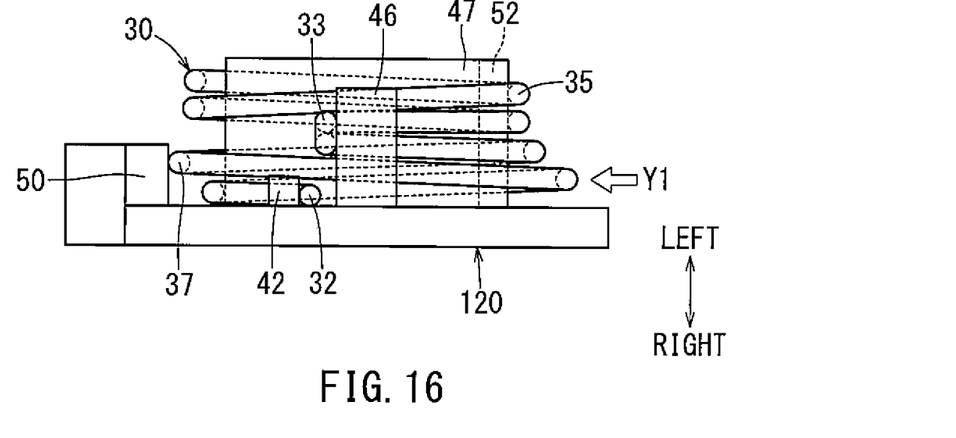
FIG. 16 is a schematic view of the throttle gear of FIG. 15 illustrating the positional relationship of the throttle gear and the return spring portion, which are viewed in the radial direction.

A second embodiment is an embodiment obtained by modifying the first embodiment described above, and hence, the description to follow will be made only to these modifications. Like components are denoted by the same numeral as that used in the first embodiment, and detailed descriptions thereof will be omitted. FIG. 15 is the schematic view showing the positional relationship of the throttle gear and the return spring portion, which are viewed in an axial direction. FIG. 16 is a schematic view showing the same, which is viewed in the radial direction. As illustrated in FIGS. 15 and 16, a single inner circumference supporting member 52 is disposed on the outer face of the spring guide 47 of the throttle gear 20. The inner circumference supporting member 52 abuts the inner circumference of at least the first loop of the return spring portion 35 on the intermediate hook portion 33 side. The inner circumference supporting member 52 is disposed at a position to abut the return spring portion 35 within a range of 90° to 180° from the intermediate hook portion 33 side of the return spring portion 35 in the winding direction of the coil spring of the return spring portion 35. The inner circumference supporting member 52 has substantially has a semi-cylindrical shape axially extending on the outer circumference of the spring guide 47.

According to the present embodiment, the load direction applied to the spring guide 47 by the reaction force of the torsional torque of the return spring portion 35 is displaced from the axial center of the throttle gear 20. Accordingly, frictional torque generated between the return spring portion 35 and the spring guide 47 can be reduced.

Figure 17:
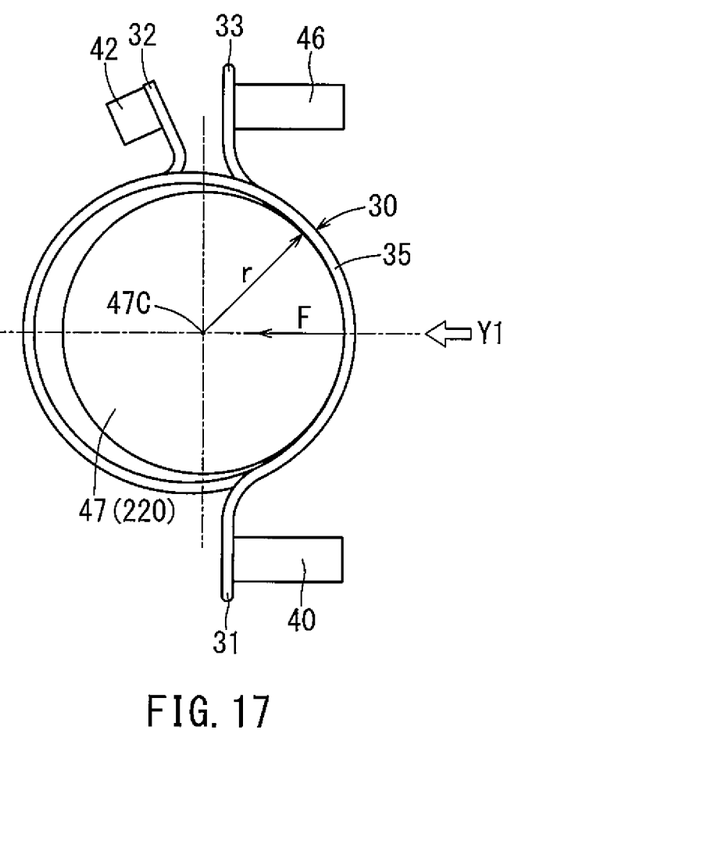
FIG. 17 is a schematic view of a second comparative example of a throttle gear and illustrating the positional relationship of the throttle gear and a return spring portion of a second comparative example, which are viewed in an axial direction.

Here, the effect of reducing the frictional torque between the return spring portion 35 and the spring guide 47 will be described by referring to a second comparative example. FIG. 17 is the schematic view showing the positional relationship of the throttle gear and the return spring portion of the second comparative example, which are viewed in the axial direction. In the second comparative example, like components are denoted with the same numerals as the second embodiment, and the detailed descriptions thereof will be omitted. As illustrated in FIG. 17, a throttle gear (labelled with a reference numeral 220) of the second comparative example is provided with no inner circumference supporting member 52 of the second embodiment illustrated in FIG. 15. The other configurations are substantially the same as the second embodiment.

In the second comparative example, the load direction applied to the spring guide 47 by the reaction force of the torsional force of the return spring portion 35 (see an arrow F in FIG. 17) passes through the axial center 47C of the spring guide 47. In this state, the sliding friction f is defined as follows:

$$f = \mu \times F$$

Where F is the load, and μ is the friction coefficient of the outer circumference of the spring guide 47. Also, the frictional torque T is defined as follows:

$$T = \mu F \times r$$

Where r is the radius of the spring guide 47.

In the present embodiment on the other hand, the inner circumference supporting member 52 comes into contact with the inner circumference of the first loop of the return spring portion 35 on the intermediate hook portion 33 side. By this contact, the load direction applied to the spring guide 47 by the reaction force of the torsional torque of the return spring portion 35 (see the arrow F in FIG. 15) is shifted from one passing through the axial center 47C of the spring guide 47 to another passing through the apex of the inner circumference supporting member 52. In this case, the load F', which passes through the axial center 47C, is defined as follows:

$$F' = F \cos \theta$$

Then, the frictional torque T is defined as follows:

$$T = \mu F \cos \theta \times r$$

Accordingly, the frictional torque T can be reduced as compared to the second comparative example.

The present invention is not limited to the above-described embodiments, and can be modified without departing from the gist of the present invention. For example, the quantity of the outer circumference supporting members 50 may increase and decrease. The inner circumference supporting member 52 may be omitted. Alternatively, the supporting member 52 may increase in number. Only the inner circumference supporting member 52 may be provided without providing the outer circumference supporting members 50.

What is claimed is:

1. A throttle device, comprising:
a throttle body including an intake passage therein;
a throttle valve rotatably disposed within the intake passage;
a throttle shaft connected to the throttle valve and configured to rotate the throttle valve within the intake passage;
a rotator configured to transmit a torque to the throttle shaft; and
a coil spring positioned between the throttle body and the rotator, wherein:
the coil spring includes a return spring portion comprising a coil wound in a first direction, an opener spring portion comprising a coil wound in a second direction that is opposite to the first direction, and an intermediate hook portion positioned between the opener spring portion and the return spring portion;
the throttle body comprises an opener stopper configured to contact the intermediate hook portion and a body-side engagement member engaging a tip portion of the return spring portion; and
the rotator comprises a rotator-side engagement member engaging a tip portion of the opener spring portion, a spring guide member facing an inner circumference of a first loop of the opener spring portion on the intermediate hook portion side and being immovable relative to the rotator, and an outer circumference supporting member contacting an outer circumference of the first loop of the opener spring portion on the intermediate hook portion side.

2. The throttle device of claim 1,
wherein the outer circumference supporting member contacts a portion of the first loop of the opener spring portion, and
wherein the portion of the first loop is within 180° to 360° from the intermediate hook portion in the second direction.

3. The throttle device of claim 1, wherein a gap between the spring guide member and the outer circumference supporting member is less than or equal to twice a wire diameter of the coil forming the opener spring portion.

4. The throttle device of claim 1, wherein the rotator includes an inner circumference supporting member contacting an inner circumference of a first loop of the return spring portion that extends from the intermediate hook portion.

5. The throttle device of claim 4, wherein the inner circumference supporting member contacts a portion of the return spring portion within 90° to 180° from the intermediate hook portion in the first direction.

6. A throttle device, comprising:
a rotator including teeth, a spring guide, and a support member extending radially outward from an outer surface of the spring guide, wherein the support member projects away from the teeth; and
a coil spring positioned between the teeth and the spring guide,
wherein the spring guide and the support member are immovable live to the rotator,
wherein the support member includes a radially inner side adjacent the outer surface of the spring guide and a radially outer side distal the outer surface of the spring guide,
where the radially outer side of the support member is positioned radially farther from the teeth than the radially inner side of the support member, and wherein the coil spring contacts the radially outer side of the support member.

7. The throttle device of claim 6, wherein:

the coil spring comprises an intermediate hook portion, and the support member contacts at least a portion of the coil spring such that the portion of the coil spring is positioned further from the teeth than the intermediate hook portion in an axial direction.

\* \* \* \* \*